Patented Feb. 13, 1934

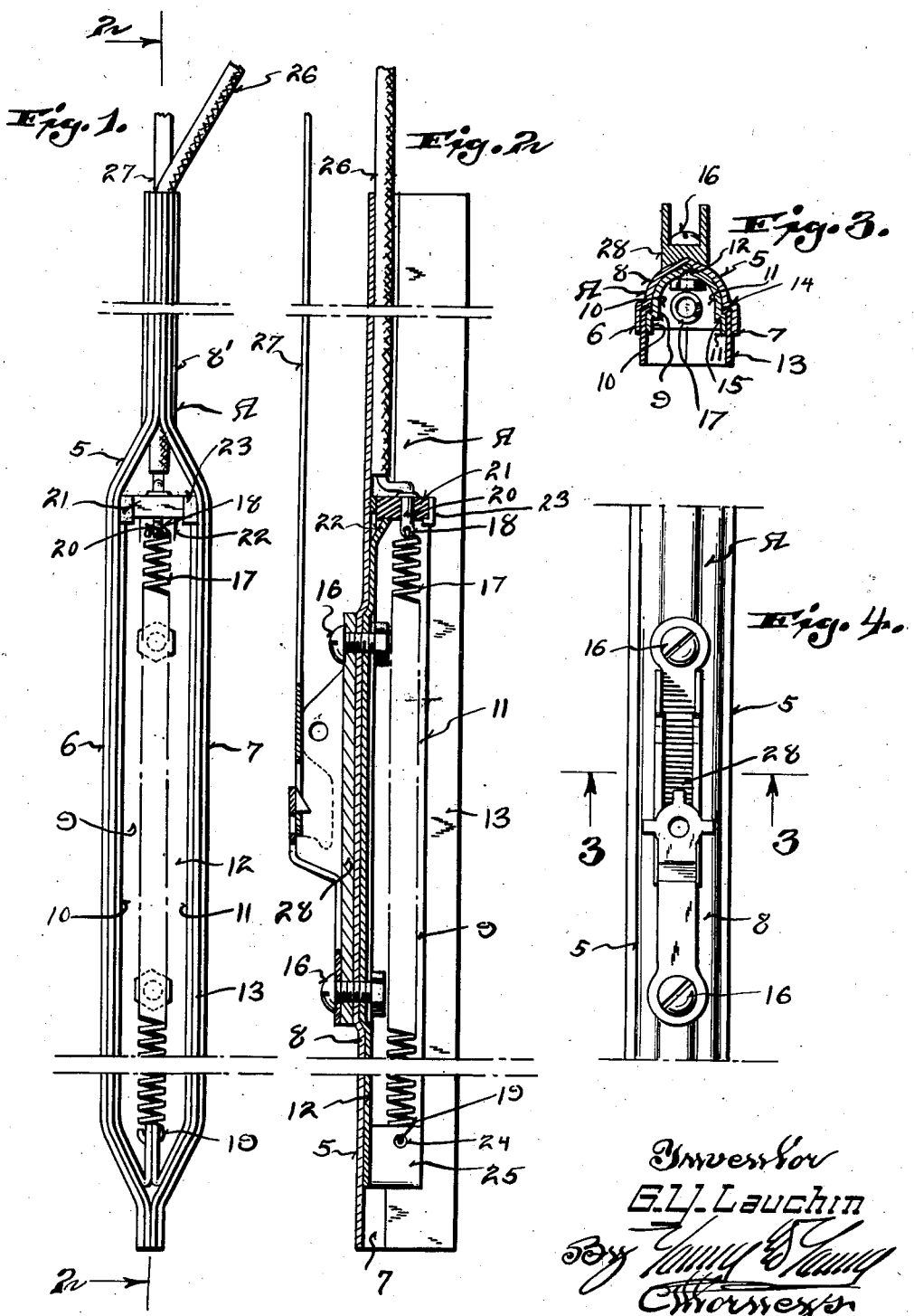

1,947,013

UNITED STATES PATENT OFFICE 1,947,013

WINDSHIELD HEATER

George Y. Lauchin, Milwaukee, Wis.

Application August 7, 1933. Serial No. 683,995

2 Claims. (Cl. 15—250)

This invention appertains to motor vehicles and more particularly to wipers for the windshields thereof.

In the use of ordinary wipers for windshields of automobiles, the same are not effective in cold weather in view of the fact that the rain or snow, as the case may be, tends to freeze on the windshield and cannot be removed by the wiper, which results in imperfect vision for the driver.

It is therefore one of the salient objects of my invention to provide a windshield wiper having an electric heating element incorporated therewith and which can be brought into play when necessary or desirable, the heating element functioning to melt the snow or ice so that the wiper can effectively clear the windshield.

Another important object of my invention is the provision of a windshield wiper having the wiper blade thereon in the form of a housing or casing for receiving the electric heating element with the rubber wiping members surrounding the element for forming a substantially airtight connection with the windshield, whereby the effectiveness of the heating element is insured for melting the ice or snow.

A further important object of my invention is the provision of novel means for mounting the heating element within the wiper blade and novel means for detachably holding the rubber wiper members in place, whereby the heating element and the rubber wiping members can be readily removed, when the same become inoperative.

A still further object of my invention is to provide an improved windshield wiper of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawing, in which drawing:—

Figure 1 is a rear elevation of a windshield wiper blade constructed in accordance with my invention.

Figure 2 is a central longitudinal section through the same taken substantially on the line 2—2 of Figure 1, looking in the direction of the arrows.

Figure 3 is a transverse sectional view through the wiper blade taken on the line 3—3 of Figure 4, looking in the direction of the arrows.

Figure 4 is a fragmentary front elevation of the wiper blade showing the means carried thereby for permitting the same to be detachably connected with the conventional wiper arms.

Referring to the drawing in detail, wherein similar reference characters designate the corresponding parts throughout the several views, the letter A generally indicates my improved windshield wiper blade which comprises an elongated metal casing or housing 5. Any desired type of metal can be utilized and the same is preferably treated in different manners so as to enhance the appearance thereof.

As shown the metal casing or housing 5 embodies parallel side walls 6 and 7 connected by a front wall 8. The side walls adjacent to the opposite ends of the housing or casing are pressed inwardly in relatively close position, as indicated by the reference character 8'. The pressed-in portions 8' of the side walls 6 and 7 effectively close the end walls of the housing or casing.

Arranged within the housing or casing is a clamping block 9, which is also preferably formed from sheet metal. This clamping block 9 embodies parallel side walls 10 and 11 and a connecting inner wall 12 and the clamping block serves as means for firmly holding the rubber wiping members 13 in position. These wiping members 13 may be of a single ply or of any desired number of plies and their inner longitudinal edges are preferably folded over or flanged as at 14, so that the shoulders 15 formed on the side walls 10 and 11 of the clamping block 9 will effectively engage and hold the same, it being obvious that the wiping members are placed between the inner faces of the walls 6 and 7 of the housing or casing 5 and the walls 10 and 11 of the clamping block 9. The clamping block can be removably held in position by means of fastening bolts 16, which bolts extend through the outer wall 8 of the housing and the inner connecting wall 12 of the clamping block. The ends of the rubber wiping members can be inserted between the compressed portions 8' of the side walls 6 and 7 of said casing, which likewise closes the ends of the housing.

The clamping block also carries and houses the electric resistance and heating element 17, which can be in the nature of a coil. The opposite terminals of the heating coil 17 are provided respectively with hooks 18 and 19. The hook 18 is adapted to engage an eye bolt 20 carried by a block of insulation 21 anchored in the said clamping block. Any preferred means may be provided for securing the insulation 21 in position and as shown, a lip 22 is struck out from the inner wall 12 of the clamping block for engaging the inner end of the insulation and ears 23 are folded over the top of the block.

These ears can be formed on the side walls 10 and 11 of said clamping block. The hook 19 is extended through openings 24 formed in wings 25 which are folded back from the side walls 10 and 11 of said clamping block.

Electrically connected with the eye bolt 20 is an electric feed wire 26, which can be connected with one terminal of the storage battery of the automobile in any preferred way. The other terminal of the heating unit is electrically connected with the clamping block and consequently, the same is grounded with the housing or casing 5, which is in turn grounded with the frame of the automobile through the medium of the wiper arm 27, illustrated in Figure 2 of the drawing.

Any desired type of switch (not shown) can be incorporated in the length of the feed wire 26 for controlling the flow of current to the said heating element 17. The switch can be disposed at any preferred point, which may be convenient to the driver of the vehicle.

Secured to the housing or casing 5 by the bolts 15 is a coupling member 28 by means of which the wiper arm 27 can be detachably connected with the wiper blade. This coupling member 28 is of a universal connection, so that the blade can be utilized with various types of wiper arms now found on the market.

In use of my improved windshield wiper, as the blade is swept across the windshield by the wiper arm 27, the rubber wiper members 13 function to clean the windshield of the rain water, as the same is deposited on the windshield. In extreme cold weather where the rain or snow tends to freeze on the windshield, the heating element 17 can be placed in circuit with the battery by means of the switch heretofore referred to and the heating element will function to melt the snow and ice, so that the same can be removed by the rubber wiper members 13.

By referring to Figures 1 and 3, it can be seen that the heating element is confined between the rubber wiper members 13 and as these members completely surround the heating element (both at the ends and sides) and engage the windshield with considerable pressure, a complete housing is formed for said heating element. Consequently, the heat from said resistance element is retained within the housing or casing 5 and this heat is impressed on the windshield, which will quickly melt the snow and ice.

From the foregoing description, it can be seen that I have provided an exceptionally simple and durable means for clearing a windshield in inclement weather both during the summer and winter seasons.

Changes in details may be made without departing from the spirit or the scope of my invention, but what I claim as new is:—

1. In a windshield wiper, a wiper blade including an elongated body having spaced parallel side walls and a connecting outer wall, the opposite walls being compressed adjacent to the opposite ends of the body into relative close position whereby to form a housing open at its inner face only, wiper members disposed in close engagement with the inside walls of the body and projecting beyond the free longitudinal edges of the same, and a clamping block removably held between said side walls for holding the wiper members in position against accidental displacement.

2. In a windshield wiper, a blade including a body having spaced parallel side walls and a connecting outer wall, the ends of the side walls being compressed into relative close position to form a substantially closed housing, wiper members disposed between the side walls in engagement with the inner faces thereof and projecting beyond the free longitudinal edges of the side walls, a hollow clamping block received within the body and engaging the inner faces of the wiper members for holding the same against accidental displacement, means detachably connecting the holding block to the body, a strip of insulation secured to the holding block at one end thereof, an eye bolt connected to said strip of insulation, bent back apertured wings formed on the holding block, an electric heating resistance coil disposed within the body having hooks on the terminals thereof engaging the eye bolt and the apertured wings, and an electric feed wire electrically connected with the eye bolt.

GEORGE Y. LAUCHIN.